(12) United States Patent
Rush, Jr.

(10) Patent No.: US 6,514,634 B1
(45) Date of Patent: Feb. 4, 2003

(54) METHOD AND SYSTEM FOR HUMIDIFICATION OF A FUEL

(75) Inventor: Kenneth McClellan Rush, Jr., Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 230 days.

(21) Appl. No.: 09/676,153

(22) Filed: Sep. 29, 2000

(51) Int. Cl.$^7$ .............................. H01M 8/04; H01M 8/12
(52) U.S. Cl. ............................ 429/17; 429/25; 429/26
(58) Field of Search ........................... 429/17, 25, 26; 252/373

(56) References Cited

U.S. PATENT DOCUMENTS

| | | | |
|---|---|---|---|
| 3,615,850 A | 10/1971 | Chludinski et al. | 136/86 |
| 4,362,788 A | 12/1982 | Maru et al. | 429/13 |
| 4,365,006 A | 12/1982 | Baker | 429/17 |
| 4,530,886 A | 7/1985 | Sederquist | 429/13 |
| 4,670,359 A | 6/1987 | Beshty et al. | 429/17 |
| 4,743,517 A | 5/1988 | Cohen et al. | 429/17 |
| 5,605,770 A | 2/1997 | Andreoli et al. | 429/20 |
| 5,768,906 A * | 6/1998 | Tsenter | 165/104.12 |
| 6,045,933 A | 4/2000 | Okamoto | 429/17 |
| 6,045,934 A | 4/2000 | Enami | 429/30 |
| 6,063,515 A * | 5/2000 | Epp et al. | 429/17 |
| 6,171,718 B1 * | 1/2001 | Murach et al. | 425/25 |
| 6,221,117 B1 * | 4/2001 | Edlund et al. | 422/193 |
| 6,274,259 B1 * | 8/2001 | Grasso et al. | 429/13 |
| 6,277,508 B1 * | 8/2001 | Reiser et al. | 422/182 |
| 6,312,842 B1 * | 11/2001 | Reiser et al. | 429/13 |
| 6,331,366 B1 * | 12/2001 | Van Dine et al. | 429/17 |
| 6,361,891 B1 * | 3/2002 | Breault et al. | 429/22 |
| 6,376,114 B1 * | 4/2002 | Bonville et al. | 429/19 |
| 6,383,670 B1 * | 5/2002 | Edlund et al. | 422/108 |
| 6,413,662 B1 * | 7/2002 | Clingerman et al. | 429/13 |
| 6,416,892 B1 * | 7/2002 | Breault | 429/13 |

FOREIGN PATENT DOCUMENTS

| | | | |
|---|---|---|---|
| JP | 57-36784 | 2/1982 | H01M/8/04 |
| JP | 58-166673 | 10/1983 | H01M/8/04 |
| JP | 60-198065 | 10/1985 | H01M/8/06 |

* cited by examiner

Primary Examiner—Carol Chaney
Assistant Examiner—Donald V. Scaltrito
(74) Attorney, Agent, or Firm—Heslin Rothenberg Farley & Mesiti P.C.

(57) ABSTRACT

A method and system for forming a hydrogen-rich reactant stream for use in a fuel cell is disclosed. The method comprises combining a hydrocarbon fuel with water to form humidified fuel and then pressurizing the humidified fuel. The pressurized, humidified fuel is then introduced to a fuel processor to produce a hydrogen-rich reactant for a fuel cell. By humidifying fuel prior to pressurization, a lower temperature of the water may be used compared to the temperature of the water required for humidifying pressurized fuel, thereby providing a more efficient method of producing a hydrogen-rich reactant for a fuel cell. Systems for effecting this method are also disclosed.

41 Claims, 1 Drawing Sheet

METHOD AND SYSTEM FOR HUMIDIFICATION OF A FUEL

TECHNICAL FIELD

This invention relates generally to fuel cells, and more particularly to methods and systems for humidifying a supply of fuel for use in a fuel cell fuel processor.

BACKGROUND OF THE INVENTION

Fuel cells electrochemically convert reactants, for example, a fuel and an oxidant, to electricity. Unlike batteries, which typically contain a set amount of chemicals for generating electricity and which stop delivering electricity once the chemicals are consumed, fuel cells can deliver electricity continuously as long as the fuel cells receive a fuel and an oxidant. Fuel cells are generally categorized according to the type of electrolyte (for example, solid oxide, molten carbonate, alkaline, phosphoric acid, or solid polymer) used to accommodate ion transfer during operation. For example, a solid polymer electrochemical fuel cell generally comprises a membrane electrode assembly (MEA). The MEA includes a solid polymer membrane or proton exchange membrane (PEM) sandwiched between and in contact with two electrodes: one electrode is referred to as the anode and the other electrode is referred to as the cathode. The membrane is typically made of a porous, electrically-conducting sheet material. The electrodes are typically made from carbon-fiber paper or cloth. In addition, at the interface of the electrode and membrane, that is, sandwiched therebetween, a platinum-based catalyst layer is provided to facilitate the electrochemical reaction.

Typically, the MEA is placed between two electrically conductive graphite plates, which have one or more reactant flow passages impressed on the surface. The reactant flow passages direct the flow of reactants to the membrane electrode assembly.

Fuel, such as humidified hydrogen, is supplied to the anode side of the fuel cell where the hydrogen reacts at the platinum-based anode catalyst layer to separate into hydrogen ions and electrons, as follows (the anode reaction):

$$H_2 \rightarrow 2H^+ + 2e^- \tag{1}$$

The solid polymer membrane permits the passage of protons (that is, the $H^+$ ions) from the anode side of the fuel cell to the cathode side of the fuel cell while preventing the passage therethrough of reactants (for example, hydrogen and air/oxygen gases). The electrons ($e^-$) generated in the reaction of Equation 1 pass through an external circuit in the form of electricity. Oxidant, such as humidified oxygen or air, is supplied to the cathode side of the fuel cell. In this cathode side, the oxygen reacts, in the presence of the platinum-based cathode catalyst, with the hydrogen ions that have passed through the membrane and with the electrons that passed through the external circuit to form liquid water, as follows (the cathode reaction):

$$1/2O_2 + 2H^+ + 2e^- \rightarrow H_2O \tag{2}$$

Additional cells can be connected together in series to form a "fuel cell stack" which provides the cumulative voltage and power output of the individual cells. Such a fuel cell stack is typically provided with inlets, outlets, and manifolds for directing the flow of reactants (as well as coolant, such as water) to the individual reactant flow plates, and assembled between a pair of thick rigid end plates. The edges of the end plates are bolted together to apply a compressive force on the fuel cell stack.

In PEM fuel cell systems, typically the membrane works more effectively if it is wet. Conversely, once any area of the membrane dries out, the electrochemical reaction in that area stops. Eventually, the dryness can progressively march across the membrane until the fuel cell fails completely. As a result, the fuel and oxidant fed to each fuel cell are usually humidified, e.g., with steam.

Where pure reactants are not readily available or economical to supply to a fuel cell, it may be desirable to use air as an oxygen source, and to use a fuel processor to convert a hydrocarbon such as methane or methanol into a hydrogen rich stream. The two reactions which are generally used to achieve this conversion as shown in equations (3) and (4).

$$1/2O_2 + CH_4 \rightarrow 2H_2 + CO \tag{3}$$

$$H_2O + CH_4 \rightarrow 3H_2 + CO \tag{4}$$

The reaction shown in equation (3) is sometimes referred to as catalytic partial oxidation (CPO). The reaction shown in equation (4) is generally referred to as steam reforming. A fuel processor may use either of these reactions separately, or both in combination. While the CPO reaction is exothermic, the steam reforming reaction is endothermic. Reactors utilizing both reactions to maintain a relative heat balance are sometimes referred to as autothermal (ATR) reactors. Also, it should be noted that fuel processors are sometimes generically referred to as reformers, and the fuel processor output gas is sometimes generically referred to as reformate, without respect to which reaction is employed.

As evident from equations (3) and (4), both reactions produce carbon monoxide (CO). Because of the high temperature at which the fuel processor is operated, this CO generally does not affect the catalysts in the fuel processor. However, if this reformate is passed to a fuel cell system operating at a lower temperature (for example, less than 100 degrees C.), the CO may poison the catalysts in the fuel cell by binding to catalyst sites, inhibiting the hydrogen in the cell from reacting. In such systems it is typically necessary to reduce CO levels to less than 100 ppm. For this reason the fuel processor may employ additional reactions and processes to reduce the CO that is produced. For example, two additional reactions that may be used to accomplish this objective are shown in equations (5) and (6). The reaction shown in equation (5) is generally referred to as the shift reaction, and the reaction shown in equation (6) is generally referred to as preferential oxidation (PROX).

$$CO + H_2O \rightarrow H_2 + C_2 \tag{5}$$

$$CO + 1/2O_2 \rightarrow CO_2 \tag{6}$$

As evident from equations (4) and (5), water may be employed as a reactant in a fuel processing system. For example, a fuel may be humidified with steam prior to entering the fuel processor, or liquid water may be fed into a desired reactor within the fuel processing system. It thus may be desirable to control the amount of water added to the fuel processor, for example to control the temperature of an ATR or reforming reactor, or to drive the shift reaction to eliminate carbon monoxide. In the case of ATR and reforming reactors, the amount of water in feed streams to such reactors is generally referred to as the steam-to-carbon ratio.

SUMMARY OF THE INVENTION

The present invention generally comprises methods and systems for increasing the efficiency of fuel processor systems. This is accomplished by humidifying a fuel stream used in a fuel cell prior to pressurizing the fuel stream. In particular, fuel having a lower pressure can be humidified with a humidifying liquid, such as water, with less energy compared to the energy required to humidify the fuel after it is pressurized.. As an example, less energy need be expended heating the humidifying liquid.

In one aspect of the present invention, a method for forming a hydrogen-rich stream (also referred to as reformate) for use in a fuel cell includes combining water and at least one of fuel and air to form a mixture at a first pressure, pressurizing the mixture to a second pressure greater than the first pressure, and reacting the mixture to produce a hydrogen-rich stream.

In a second aspect, a system for forming a hydrogen-rich stream for use in a fuel cell includes a pressurizing device having an inlet for receiving a mixture of water and at least one of fuel and air at a first pressure and an outlet for discharging the mixture at a second pressure greater than the first pressure, and a reactor having an inlet operatively connected to the outlet of the pressurizing device and an outlet for discharging the hydrogen-rich stream for use in the fuel cell.

In a third aspect, a method for forming a hydrogen-rich stream for use in a fuel cell includes (a) providing a first stream of fuel having a first moisture content, (b) exposing the first stream of fuel to an aqueous fluid to produce a second stream of fuel at a first pressure and a second moisture content higher than the first moisture content, (c) pressurizing the second stream to produce a third stream of fuel having a second pressure higher than the first pressure, and (d) introducing the third stream to a reactor to produce the hydrogen-rich stream.

In a fourth aspect, a method for forming a hydrogen-rich stream for use in a fuel cell includes heating water, combining the heated water with at least one of fuel and air to form a mixture at a first pressure, pressurizing the mixture to a second pressure greater than the first pressure, and reacting the mixture to produce the hydrogen-rich stream.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be understood from the following detailed description of preferred embodiments taken in conjunction with the accompanying drawing in which:

DETAILED DESCRIPTION OF THE INVENTION

Figure 1:
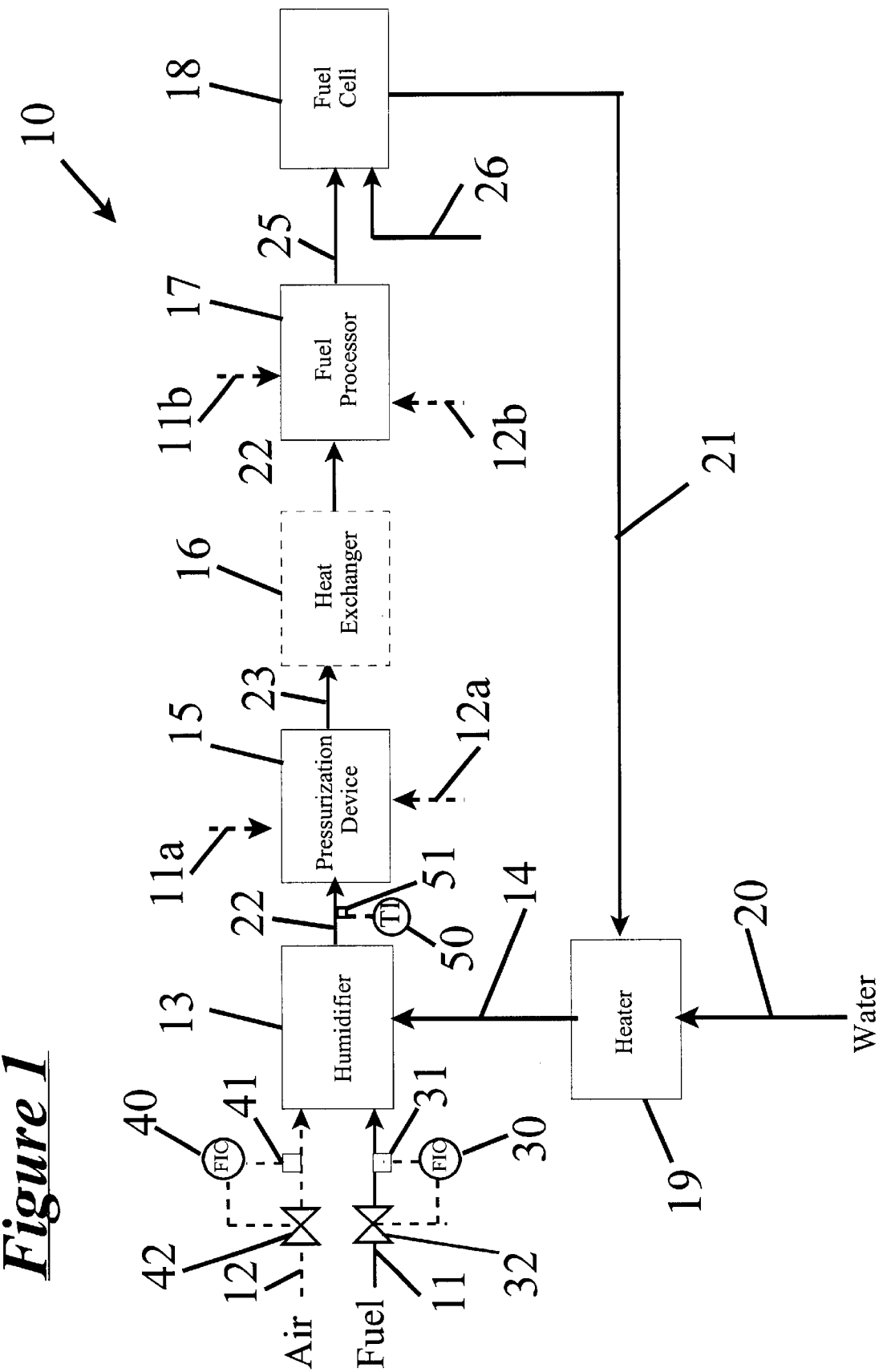
FIG. 1 is a schematic block diagram of a fuel cell system for forming a hydrogen-rich stream for use in a fuel cell in accordance with several embodiments of the present invention.

FIG. 1 illustrates a schematic block diagram of a fuel cell system 10 for forming a hydrogen-rich stream for use in a fuel cell 18. In this exemplary embodiment, system 10 includes, a humidifying device (or humidifier) 13 operable to receive a supply of water 14, a supply of fuel 11, and a supply of air 12; a pressurization device 15; a fuel processor 17; and fuel cell 18. The fuel 11 may be any form of hydrocarbon fuel, for example, methane, propane, methanol, ethanol, or natural gas from which the humidified hydrogen-rich stream can be obtained. Fuel 11 may be provided in the form of a liquid or gas, but is preferably provided as a gas. Fuel 11 is introduced to humidifying device 13 wherein the fuel is exposed to some form of aqueous medium 14, typically liquid water or steam. The humidifying device 13 may be any conventional device for exposing a liquid or gas stream to an aqueous stream. For example, humidifying device 13 may simply be a conduit carrying the fuel to which an aqueous stream of fluid is introduced, for example, a horizontal fuel-containing conduit into which water is introduced by means of a radial conduit. Humidifying device 13 may also be liquid-gas or gas-gas contact tower having media for enhancing gas-liquid or gas-gas contact, for example, a packed column or plate column with or without recirculation. Humidifying device 13 may also simply be a conduit for introducing water or steam to the inlet of pressurizing device 15.

Fuel 11 (natural gas in this example) is provided at a pressure less than about 10 inches of water. It will be appreciated that the invention is not limited according to the specific temperatures and pressures that are used. Automated flow indicator controller (FIC) 30 typically regulates the flow of fuel 11. FIC 30 receives a flow indication from flow meter 31 and varies the flow via automatic valve 32, typically to maintain the fuel flow to a preset value, for example, from zero to about 50 standard liters per minute of natural gas for a load-following 7 kilowatt fuel cell system.

As discussed above, air 12 is provided to the humidifying device 13. However, as shown by dashed arrows 12a and 12b air may also be introduced to pressurizing device 15 or to fuel processor 17. Automated flow indicator controller (FIC) 40 typically regulates the flow of air 12. FIC 40 receives a flow indication from flow meter 41 and a varies the flow via automatic valve 42, typically to maintain the gas flow to a preset value. Other methods of providing and regulating air and fuel flow are possible.

Alternately, air 12 may be introduced to humidifying device 13 without the introduction of fuel 11. In this embodiment of the invention, the air stream is first humidified and the fuel is introduced at a downstream location, for example, to pressurizing device 15 via conduit 11a or to fuel processor 17 via conduit 11b.

As described above, water 14 is used as the source of moisture in humidifying device 13. The water 14 is typically provided by water supply 20 heated by a heater 19. Heater 19 may be any form of device for heating water supply 20, but is preferably a direct or indirect heat exchanger or boiler. In one embodiment of the invention, water supply 20 introduced to heater 19 is heated by means of exhaust gas 21 from fuel cell 18. The exhaust gas 21, or "tail gas", may be anode exhaust gas or cathode exhaust gas. The exhaust gas 21 may be passed in heat-exchange relationship in a direct or indirect heat exchanger with water supply 20. Also, the exhaust gas 21 may also provide heat to water supply 20 by undergoing combustion and passing the hot combustion gases in heat-exchange relationship with water supply 20, for example, as in boiler. In one embodiment of the invention, heater 19 is a tail gas oxidizer, in particular, an anode tail gas oxidizer.

Temperature indicator (TI) 30 typically monitors the temperature of the humidified fuel in conduit 22. TI 50 receives a temperature indication from thermocouple 51. The temperature in conduit 22 is typically controlled to a temperature range between about 70 degrees C. and about 100 degrees C.

The fuel humidified in humidifying device 13 is then passed via conduit 22 to pressurization device 15. Pressurization device 15 is typically a fan or blower that pressurizes the fuel stream 13 from a first pressure, typically less than about 10 inches of water, to a second higher pressure, typically at least about 20 inches to about 30 inches of water gage. It will be appreciated that pressurization device 15 may provide an increased or decreased pressure stream of varying pressures depending on the requirements of fuel processor 17. The pressure created by pressurizing device 15 may cause the saturation, sub-saturation or super-saturation of the fuel stream depending on the temperature and moisture content thereof. For example, if the fuel stream is saturated when entering pressurization device 15, the increased pressure may decrease the fuel streams ability to retain moisture and therefore liquid water will "fall out" of the fuel stream. In such a case it may be necessary to use a "wet" blower capable of handling liquid water in the stream. Suitable blowers are available, as an example, from Torrington Research Company in Torrington, Conn. Alternatively, air may be introduced to pressurization device 15 via conduit 12a.

The humidified and pressurized fuel stream is then passed via conduit 23 to fuel processor 17 wherein the hydrocarbon stream of fuel is converted into a hydrogen-rich stream. Fuel processor 17 may include a steam reformer, and/or partial catalytic oxidizer. The hydrogen-rich stream produced by fuel processor 17 is forwarded to the fuel cell 18 via conduit 25 at a temperature between about 50 degrees C. and about 80 degrees C. and at a pressure greater than about 20 inches of water gage. Alternatively, air may also be introduced to the fuel processor 17 via conduit 12b.

The pressurized hydrocarbon fuel in conduit 23 may also be optionally heated by means of heat exchanger 16 (shown by a dashed line in FIG. 1) before being introduced to fuel processor 17. Heat exchanger 16 may a direct or indirect heat exchanger. Heat exchanger 16 may also be a stand-alone unit or may be integrally mounted on fuel processor 17. Heat exchanger 16 may further be provided with any source of heat internally or externally available in system 10. For example, heat exchanger 16 may be provided with an external source of steam or provided with hot exhaust gases 21 from fuel cell 18. When integrally mounted on fuel processor 17, the excess heat generated by fuel processor 17 may be the source of heat for heat exchanger 16.

The pressurized, humidified, fuel stream in conduit 23 may be saturated or subsaturated at a temperature between about 70 degrees C. and about 100 degrees C. According to the present invention, it is preferred that the fuel stream be subsaturated to minimize the potential for condensation in pressurization device 15. The fuel stream discharged from the pressurization device 15 typically has a "steam to carbon" ratio of between about 2 to about 5 (such a fuel stream is generally unsaturated such that in preferred embodiments a dry blower can be used with the system as the pressurization device).

Fuel cell 18 is typically a fuel cell stack containing a plurality of individual fuel cells. An oxygen-containing gas (or oxidant), typically air, is provided to the fuel cell via a conduit 26. The individual cells of fuel cell 18 include an anode reaction flow passage to which the hydrogen-rich gas in conduit 25 is introduced and a cathode reaction flow passage to which the oxidant 26 is introduced. A typical fuel cell 18 may include a solid polymer membrane or PEM (proton exchange membrane) between the cathode and anode reaction flow passages such as a material manufactured by E. I. Du Pont de Nemours Company and sold under the trademark NAFION®. The polymer membrane can selectively pass hydrogen ions from the anode reaction passage to the cathode reaction passage. Catalysts (for example, platinum), which facilitate chemical reactions, are desirably applied to the anode and cathode sides of the individual fuel cells of fuel cell 18. The hydrogen-rich gas stream reacts via the anode reaction (Equation 1) to provide a source of electrons, for an external flow of electricity, and a source of hydrogen ions ($H^+$). The hydrogen ions pass through the PEM and contribute to the cathode reaction (Equation 2) to produce heat and water. The fuel cell 18 typically contains a plurality of cooling plates interspersed between the plurality of fuel cells through which a coolant is recirculated to maintain fuel cell 18 at a generally constant operating temperature, for example, at a temperature of about 50 degrees C. to about 80 degrees C.

Exhaust gases from one or both the anode and cathode reaction passages are discharged from fuel cell 18 via conduit 21. Exhaust gases in conduit 21 typically have at least some heating value. These hot gases can be passed in heat-exchange relationship with other streams to heat the streams. Also, anode tail gases may contain at least some residual unreacted hydrogen. The residual hydrogen in the anode tail gas can be burned to provide a source of heat for other streams in the system. In one embodiment of the invention, as discussed above, the tail gas in conduit 21 is used to heat water supply 20 introduced to the humidifying device 13 in heater 19 either directly or after combustion.

According to the present invention, system 10 and corresponding method provide a more energy efficient means for providing a hydrogen-rich fuel stream 25 to a fuel cell 18. According to the present invention, the humidification performed in humidifying device 13 is practiced prior to the pressurization of the fuel and/or air effected in pressurization device 15, and prior to fuel processor 17. By humidifying the air 12 and/or fuel 11 at a low pressure, the saturation temperature of the liquid stream 14 introduced to the humidifying device 13 is lower and humidification of the air 12 and/or fuel 11 can be practiced at a lower temperature. As a result, the aqueous stream 14 can be introduced to the humidifying device 13 at a lower temperature, that is, less heating of water supply 20 need be practiced in the heater 19 to provide the desired humidification of fuel 11. Furthermore, less heat or energy, for example, from exhaust tail gas 21, needs to be provided to the water supply 20 such that the energy in exhaust gas 21 can be used elsewhere in the system, for example, as a source of heat in heat exchanger 16.

Although various embodiments have been illustrated and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for forming a hydrogen-rich stream for use in a fuel cell, the method comprising:
    (a) providing a first stream of fuel having a first moisture content;
    (b) exposing the first stream of fuel to an aqueous fluid to produce a second stream of fuel at a first pressure and a second moisture content higher than the first moisture content;
    (c) pressurizing the second stream to produce a third stream of fuel having a second pressure higher than the first pressure; and
    (d) introducing the third stream to a reactor to produce the hydrogen-rich stream.

2. The method of claim 1 wherein the first pressure is ambient pressure.

3. The method of claim 1 wherein the aqueous fluid is at least one of water and steam.

4. The method of claim 1 wherein the second moisture content corresponds to a subsaturated fuel stream at a temperature between about 70 degrees C. and about 100 degrees C.

5. The method of recited in claim 1 wherein the second pressure is at least 20 inches of water gage.

6. The method of claim 1, further comprising heating the aqueous fluid.

7. The method of claim 6, wherein heating the aqueous fluid comprises heating the aqueous fluid using exhaust from the fuel cell.

8. The method of claim 7, wherein heating the aqueous fluid comprises passing the aqueous fluid in heat-exchange relationship with at least one of a fuel cell exhaust and a product of combustion of a fuel cell exhaust.

9. The method of claim 1, further comprising introducing an oxygen-containing gas to one of the first stream, the second stream, and the third stream.

10. The method of claim 9, wherein the oxygen-containing gas comprises air.

11. The method of claim 1, wherein the reactor comprises one of a steam reformer and a partial catalytic oxidizer.

12. The method of claim 1, wherein the fuel is a hydrocarbon fuel.

13. The method of claim 12, wherein the hydrocarbon fuel is selected from the group of fuels consisting of methane, propane, methanol, ethanol, and natural gas.

14. The method of claim 1, wherein pressurizing the second stream comprises pressurizing the second stream using one of a fan and a blower.

15. The method of claim 14, wherein pressurizing the second stream comprises pressurizing the second stream using a wet blower.

16. The method of claim 1, further comprising (e) introducing the hydrogen-rich stream to a fuel cell.

17. The method of claim 16, wherein (e) introducing the hydrogen-rich stream to a fuel cell comprises (e1) introducing the hydrogen-rich stream to a PEM-type fuel cell.

18. The method of claim 7, wherein heating the aqueous fluid comprises passing the aqueous fluid in heat-exchange relationship with one of anode fuel cell exhaust and cathode fuel cell exhaust.

19. The method of claim 1, further comprising (f) heating the third stream.

20. The method of claim 19, further comprising (e) introducing the hydrogen-rich stream to a fuel cell, and wherein (f) heating the third stream comprises heating the third steam using at least one exhaust gas from the fuel cell.

21. The method of claim 1, wherein the second stream is subsaturated.

22. A system for forming a hydrogen-rich stream for use in a fuel cell, said system comprising:
    a pressurizing device having an inlet for receiving a mixture of water and at least one of fuel and air at a first pressure and an outlet for discharging the mixture at a second pressure greater than the first pressure;
    a reactor having an inlet operatively connected to said outlet of said pressurizing device, and an outlet for discharging the hydrogen-rich stream for use in the fuel cell; and
    a heat-exchanger having an inlet operatively connected to said outlet of said pressurizing device and an outlet operatively connected to said inlet of said reactor.

23. The system of claim 22, wherein said heat-exchanger is integral with said reactor.

24. The system of claim 22, wherein said reactor is at least one of a steam reformer and a partial catalytic oxidizer.

25. The system of claim 22, further comprising a humidifier having a fuel inlet and a humidified fuel outlet operatively connected to said inlet of said pressurizing device.

26. The system of claim 25, wherein the humidifier further comprises an inlet for an aqueous fluid, and wherein the system further comprises a heater for heating the aqueous fluid.

27. The system of claim 26, wherein said heater is at least one of a heat exchanger and a fuel cell exhaust gas oxidizer.

28. The system of claim 22, wherein said pressurizing device is at least one of a fan and a blower.

29. The system of claim 22, wherein the fuel is a hydrocarbon fuel.

30. The system of claim 29, wherein the hydrocarbon fuel is selected from the group of fuels consisting of methane, propane, methanol, ethanol, and natural gas.

31. A system for forming a hydrogen-rich stream for use in a fuel cell, said system comprising:
    a pressurizing device having an inlet for receiving a mixture of water and at least one of fuel and air at a first pressure and an outlet for discharging the mixture at a second pressure greater than the first pressure; and
    a reactor having an inlet operatively connected to said outlet of said pressurizing device, and an outlet for discharging the hydrogen-rich stream for use in the fuel cell;

wherein said pressurizing device comprises a wet blower.

32. The system of claim 31, further comprising a humidifier having a fuel inlet and a humidified fuel outlet operatively connected to said inlet of said pressurizing device.

33. The system of claim 31, wherein the fuel is a hydrocarbon fuel.

34. A system for forming a hydrogen-rich stream for use in a fuel cell, said system comprising:

a pressurizing device having an inlet for receiving a mixture of water and at least one of fuel and air at a first pressure and an outlet for discharging the mixture at a second pressure greater than the first pressure; and a reactor having an inlet operatively connected to said outlet of said pressurizing device, and an outlet for discharging the hydrogen-rich stream for use in the fuel cell;

wherein the system further comprises a humidifier having a fuel inlet and a humidified fuel outlet operatively connected to said inlet of said pressurizing device.

35. The system as in claim 34, further comprising a heat-exchanger having an inlet operatively connected to said outlet of said pressurizing device and an outlet operatively connected to said inlet of said reactor.

36. The system of claim 35, wherein said heat-exchanger comprises a heat exchanger which is integral with said reactor.

37. The system of claim 34, wherein said reactor is at least one of a steam reformer and a partial catalytic oxidizer.

38. The system of claim 34, wherein the humidifier further comprises an inlet for an aqueous fluid, and wherein the system further comprises a heater for heating the aqueous fluid.

39. The system of claim 38, wherein the aqueous fluid comprises one of water and steam.

40. The system of claim 34, wherein the fuel is a hydrocarbon fuel.

41. The system of claim 40, wherein the hydrocarbon fuel is selected from the group of fuels consisting of methane, propane, methanol, ethanol, and natural gas.

* * * * *